(12) United States Patent
Fascinato et al.

(10) Patent No.: US 7,317,992 B2
(45) Date of Patent: Jan. 8, 2008

(54) METHOD AND APPARATUS FOR INSPECTING DOVETAIL EDGEBREAK CONTOUR

(75) Inventors: Jason Brian Fascinato, Cincinnati, OH (US); Timothy M. Martinkovic, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 675 days.

(21) Appl. No.: 10/869,019

(22) Filed: Jun. 16, 2004

(65) Prior Publication Data

US 2005/0283334 A1   Dec. 22, 2005

(51) Int. Cl.
*G06F 19/00* (2006.01)
*G06F 17/40* (2006.01)

(52) U.S. Cl. ............ 702/34; 73/104; 73/865.8; 700/161; 700/194; 700/195; 702/33; 702/35; 702/81; 702/167; 702/187; 702/189

(58) Field of Classification Search ............ 73/104, 73/105, 865.8; 356/2, 237.1, 237.2, 241.1, 356/388, 600, 601, 614, 625, 626; 382/100, 382/108, 141, 152, 153; 700/90, 159, 160, 700/161, 174, 175, 186, 187, 194, 195; 702/1, 702/33, 34, 35, 81, 127, 150, 152, 155, 167, 702/187, 189
See application file for complete search history.

(56) References Cited

U.S. PATENT DOCUMENTS

| | | | |
|---|---|---|---|
| 2,691,887 A | * | 10/1954 | Rinker ............ 73/105 |
| 2,868,087 A | * | 1/1959 | Morgan, Jr. ............ 409/100 |
| 3,548,173 A | * | 12/1970 | Pascoe et al. ............ 700/88 |
| 4,166,323 A | | 9/1979 | Maag |
| 4,337,580 A | | 7/1982 | Tanno et al. |
| 4,591,784 A | | 5/1986 | Kolitsch et al. |
| 5,131,166 A | | 7/1992 | Weber et al. |
| 5,315,234 A | | 5/1994 | Sutton, Jr. et al. |
| 5,371,462 A | | 12/1994 | Hedengren et al. |
| 5,442,286 A | | 8/1995 | Sutton, Jr. et al. |
| 6,033,185 A | | 3/2000 | Lammas et al. |
| 6,366,689 B1 | | 4/2002 | Rao et al. |

(Continued)

FOREIGN PATENT DOCUMENTS

EP   0 533 440 A1   9/1992

(Continued)

*Primary Examiner*—Edward R Cosimano
(74) *Attorney, Agent, or Firm*—McNees Wallace & Nurick LLC

(57) ABSTRACT

A method and tooling for inspecting a contour of an edge of a cutout formed in a disk, each cutout fixedly receiving a turbine blade. A first device receives the disk containing the cutouts. A second device has a sensor associated with the movement of an instrument, the first device securing the disk at a predetermined orientation to the sensor. The disk is secured to the first device, the instrument being directed along the cutout defining a path substantially parallel to a surface of the contour, the instrument remaining in physical contact with the surface of the contour. The sensor transmits a signal associated with instrument movement to an algorithm to convert the signal to two-dimensional positions along the tangent path along the surface of the contour. The acceptability of the edge contour of the cutout is determined by comparing the two-dimensional positions to predetermined ranges of values.

20 Claims, 15 Drawing Sheets

U.S. PATENT DOCUMENTS

| | | |
|---|---|---|
| 6,608,478 B1 | 8/2003 | Dziech et al. |
| 6,642,519 B2 | 11/2003 | Ikeda |
| 6,694,634 B2 * | 2/2004 | Sato et al. .................... 33/503 |
| 6,858,826 B2 * | 2/2005 | Mueller et al. .......... 250/208.1 |
| 2003/0019119 A1 * | 1/2003 | Sato et al. .................... 33/503 |
| 2003/0221497 A1 | 12/2003 | Murphy et al. |
| 2003/0223631 A1 | 12/2003 | Ine |
| 2004/0169648 A1 * | 9/2004 | Sawada ..................... 345/419 |
| 2005/0283334 A1 * | 12/2005 | Fascinato et al. ........... 702/167 |

FOREIGN PATENT DOCUMENTS

| | | |
|---|---|---|
| EP | 1 202 053 A1 | 5/2002 |
| EP | 1 416 122 | 5/2004 |
| JP | 5-240840 | 9/1993 |
| JP | 8-5364 | 1/1996 |
| JP | 11-312098 | 11/1999 |
| WO | WO 88/07190 | 9/1988 |

* cited by examiner

METHOD AND APPARATUS FOR INSPECTING DOVETAIL EDGEBREAK CONTOUR

BACKGROUND OF THE INVENTION

The present invention relates generally to a method and apparatus for inspecting turbine engines. More specifically, the present invention relates to method and apparatus for inspecting the surface contour of an edge of a cutout formed in a disk for fixedly receiving a turbine blade.

In an aircraft gas turbine (jet) engine, air is drawn into the front of the engine, compressed by a shaft-mounted compressor, and mixed with fuel. The mixture is burned, and the hot exhaust gases are passed through a turbine mounted on the same shaft. The flow of combustion gas turns the turbine by impingement against an airfoil section of the turbine blades and vanes, which turns the shaft and provides power to the compressor and fan. In a more complex version of the gas turbine engine, the compressor and a high-pressure turbine are mounted on one shaft, and the fan and low-pressure turbine are mounted on a separate shaft. The hot exhaust gases flow from the back of the engine, driving it and the aircraft forward.

The turbine is composed of a disk having a plurality of complex, closely toleranced slots machined along the periphery of the disk to receive a portion of the turbine blades referred to as a dovetail. The contour of slots is typically formed by broaching. Broaching is a production technique whereby a cutter, typically referred to as a broach, is used to finish cutouts or apertures of circular, square or irregular sections. In broaching, the action of the broach itself serves as a clamping medium so that the operation may be completed in a minimum of time. The cutting tool or broach is typically provided with many teeth graded in size such that each takes a small chip when the tool is directed through the previously prepared leader aperture.

In the case of disks for securing the dovetails of turbine blades, broaching produces an amount of disk material tear out that extends past the surface of the disk opposite the surface in which the broach is first directed, or exit side of the disk. This tear out is in the form of jagged discontinuities or burrs typically formed along substantially the entire periphery of the broached cutout or aperture. Material along the broached area contains reduced strength properties. Since this broached region is highly stressed in operation, care must be taken to remove these discontinuities to avoid the possibility of stress-induced cracking, which can significantly reduce component life. The process of removing the tear out discontinuities is referred to as breaking the edge or producing an edgebreak or breakage. Material was typically removed from the slot peripheries, such as by machining techniques, to form small rounded edges along the exit side of the disk. Unfortunately, it has been recently discovered that the rounded edges of a considerable number slot peripheries were of insufficient size to remove discontinuous regions formed by broaching, and that follow-up machining or other techniques of material removal is now required to enlarge the radius of the rounded edge or form a chamfer to preserve component life. Thus, a significant number of disks of turbine engines in operation are likely in need of this retrofit operation. To determine whether the disk requires retrofit machining, an inspection is conducted. These disk re-inspections are in addition, of course, to the on-going need to inspect newly fabricated turbine disks.

Further complicating matters, commonly used techniques for inspecting edgebreaks are time-consuming and prone to error. For example, a wax-and-trace technique involves manually placing heated wax to the surface of the disk, waiting for the wax to cool, properly removing the wax, i.e., without deforming or distorting the wax impression, and then visually aligning the impression for mechanical trace to ensure that the trace direction is normal to contour centerlines. Not only did this technique expend up to ten minutes for each peripheral slot, but gage repeatability and reproducibility approached 50 percent. In other words, the impression associated with the wax-and-trace technique, even if done correctly, could account for about one half of the total permissible range of dimensional variation of the edge contour of the slot. Due to the time-consuming nature of the wax-and-trace technique, inspections for edgebreaks may be further limited, thus increasing the probability of missing a defect.

What is needed is a method or apparatus for inspecting turbine disks that can be performed more quickly and having improved gage repeatability and reproducibility.

SUMMARY OF THE INVENTION

The present invention is directed to a method of inspecting a contour of an edge of a cutout of a plurality of cutouts formed in a disk, each cutout of the plurality of cutouts for fixedly receiving a turbine blade. The method includes the steps of: providing a first device for receiving the disk; providing a second device having a sensor and an instrument in association with the sensor, the first device securing the disk at a predetermined orientation to the sensor; securing the disk to the first device; positioning the instrument adjacent a cutout of a plurality of cutouts formed in the disk; directing a tip of the instrument over a point of tangency along an edge of a cutout of the plurality of cutouts, the tip following a path along the surface of the contour that is substantially coincident with a plane defined by an axis of tangency with the point of tangency and a line substantially normal to the edge of the contour, the instrument being in physical contact with the surface of the contour; transmitting a signal from the sensor based upon movement of the instrument to an algorithm; converting the signal received by the algorithm to a plurality of positions along the path; and comparing the plurality of positions to predetermined ranges of values for determining acceptability of the contour of an edge of the cutout of the plurality of cutouts.

One advantage of the present invention is it requires significantly less time to inspect disk slot end contours for receiving turbine blades.

Another advantage of the present invention is it has enhanced gage repeatability and reproducibility.

A further advantage of the present invention is that it is can be easily performed.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
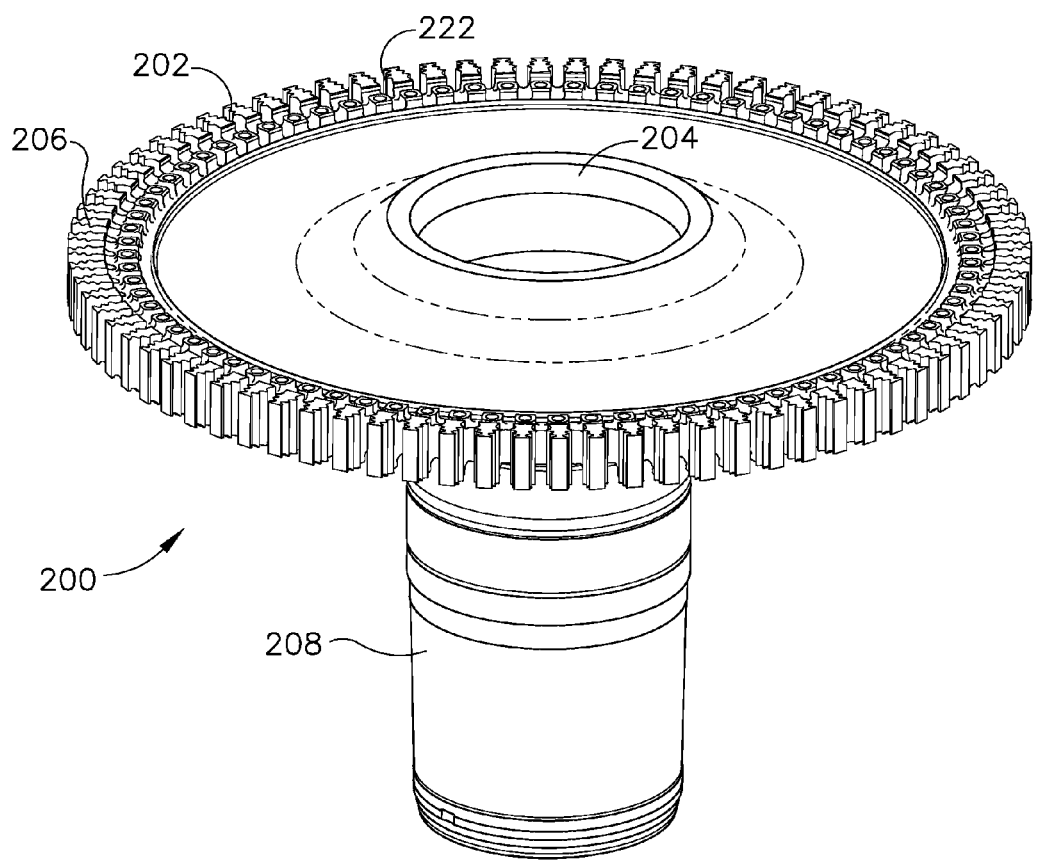
FIG. 1 illustrates a perspective view of a turbine disk.
Figure 1A:
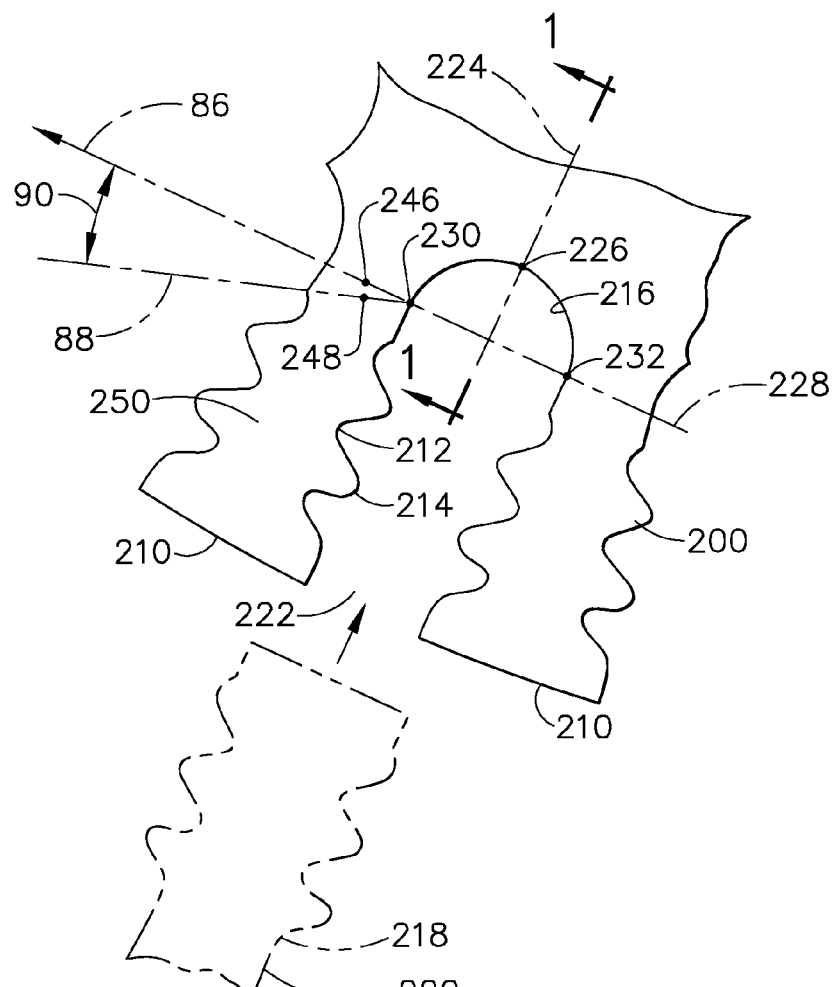
FIG. 1A is an enlarged partial plan view of a turbine disk.
Figure 2:
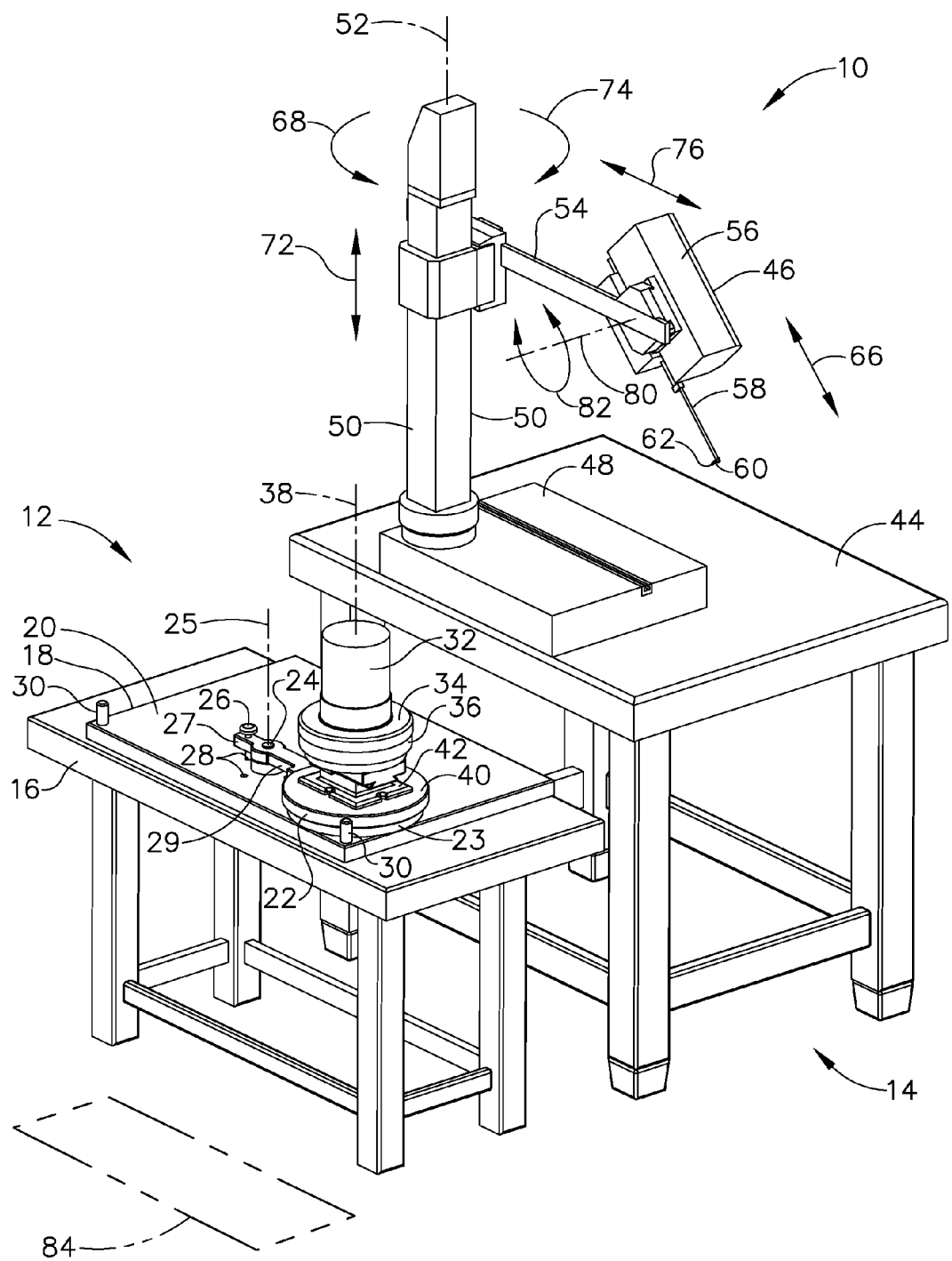
FIG. 2 is a perspective view of the inspection apparatus of the present invention.

FIG. 2 illustrates one embodiment of an inspection apparatus 10 for inspecting a dovetail edgebreak contour formed in a turbine disk 200. Referring to FIGS. 1 and 1A, turbine disk 200 includes a disk portion 206 extending to a sleeve portion 208. A bore 204 is formed through both disk portion 206 and sleeve portion 208 to engage a shaft of a jet engine to turn the turbine disk 200. The periphery of disk portion 206 is commonly referred to as a root form 202. Root form 202 includes a plurality of substantially uniformly spaced, radially outwardly extending posts 210. Each post 210 includes a plurality of dovetail protrusions 212 and dovetail indentions 214 that are formed on opposite sides along the length of the post 210. A cutout or slot 222 is defined by facing surfaces of adjacent post 210 connected by a base 216. Cutout or slot 222 receives a dovetail portion 218 of a turbine blade 220.

Cutout or slot 222 preferably includes an axis of symmetry 224. Coincident with both base 216 and axis of symmetry 224 is a point of tangency 226. Base 216 preferably includes a curved contour that provides symmetric points of tangency 230, 232 with opposed sides of slot 222 having dovetail indentions and protrusions 212, 214, such as along an axis 228. As further discussed below, the inspection apparatus 10 includes a process to inspect slot 222, such as at points of tangency 224, 230 and 232, although it is to be understood that inspection apparatus 10 can be used to inspect any number of desired points of tangency along the slot 222.

Referring back to FIG. 2, inspection apparatus 10 includes a first device 12 and a second device 14 that interact to permit an accurate, convenient and quickly performable means of obtaining edgebreak dimensions for comparison with predetermined levels. First device 12 can include a table 16, which supports a plate 18 having a substantially flat surface 20. Flat surface 20 of plate 18 supports a workpiece carriage 22 having a base portion 23 that extends to a neck portion 29. Opposite the end of neck portion 29 that is connected to base portion 23 is an end having an aperture 27 for receiving a locating pin 26, such as a ball lock pin. Interposed between the ends of neck portion 29 is a pivot 24 that includes a fastener that is directed through both the neck portion 29 and plate 18, pivot 24 having an axis of rotation 25. In other words, workpiece carriage 22 slidably rotates about pivot 24 having an axis of rotation 25 along surface 20 of plate 18. Pegs 30 limit the angular range of rotation of workpiece carriage 22 about pivot 24 to ensure workpiece carriage 22 fully remains within the footprint of plate 18, which in a preferred embodiment enables workpiece carriage to rotate approximately 180 degrees. To secure workpiece carriage 22 in a desired position, aperture 27 of neck portion 29 is aligned with one of a plurality of table apertures 28 formed in plate 18, and locating pin 26 is directed through both aperture 27 and table aperture 28. The plurality of table apertures 28 define different locating positions of the workpiece carriage 22. It is to be understood that any number of table apertures 28 may be formed in plate 18 and that any number of angular spacings between adjacent table apertures 28 or arrangements may be selected as desired. For example, a preferred embodiment can contain table apertures 28 in a first position, or home position, a second position that is achieved by rotating the workpiece carriage 22 approximately 90 degrees counterclockwise about pivot 24 from the first position, and a third position which is achieved by rotating the workpiece carriage 22 approximately an additional 90 degrees counterclockwise about pivot 24 from the second position. Thus, the third position is approximately 180 degrees from the first position.

A point of reference for use with the Figures is position 84 which is adjacent one side of table 16 that is opposite a table 44 of the second device 14. From point of reference 84, in the first position, the base portion 23 extends to the right of pivot 24, defining a three o'clock position. Similarly, for purposes herein, the second position defines a twelve o'clock position, and likewise, the third position defines a nine o'clock position.

To permit workpiece carriage 22 to secure turbine disk 200, workpiece carriage 22 includes a substantially vertically extending spindle 36 mounted on a cross-slide table 42 that is rotatable about an axis of rotation 38 independently of axis of rotation 25. It is preferable that spindle 36 defines a substantially cylindrical profile with a sufficient conical element such that the diameter of the end of the spindle 36 opposite surface 20 is less that the diameter of the base of the spindle 36 so that the bore 204 of the turbine disk 200 is substantially self-centered in a substantially vertical orientation when the turbine disk 200 is lowered over the spindle 36. Preferably, spindle 36 is covered by a sleeve 32 that extends to a base 34 that surrounds the periphery of sleeve 32 adjacent the surface 20 of plate 18. Sleeve 32 and base 34 are preferably composed of a layer of a relatively soft material as compared to the turbine disk 200, such as any number of hard machinable plastics, non-metallic materials or other non-marring materials, so as not to damage the bore 204 of the turbine disk 200 when the turbine disk 200 is installed over the spindle 36. However, sleeve 32 and base 34 are composed of material that is also rigid enough not to flex excessively when compressed between the turbine disk 200 and the workpiece carriage 22, thus providing a repeatable, consistent orientation of the turbine disk 200 when installed.

To install turbine disk 200 on spindle 36, the turbine disk 200 is positioned above the workpiece carriage 22 and the center of the bore 204 is aligned with the axis of rotation 38. After alignment between the spindle 36 and turbine disk 200 is achieved, the bore 204 of the turbine disk 200 is directed into contact with the sleeve 32 and base 34.

In addition to permitting rotational movement about axis 38, cross-slide table 42 additionally incorporates the ability to make minute adjustments in either or both of two mutually perpendicular axis directions along the surface 20 of plate 18, such as X and Y axes. Due to the considerable weight of turbine disk 200, an air bearing 40 is preferably incorporated beneath workpiece carriage 22. Air bearing 40 includes an interface with a pneumatic source (not shown), which provides a layer of compressed air to be trapped beneath the surface beneath the air bearing 40 and the surface 20 of plate 18 to provide a substantially frictionless interface between workpiece carriage 22 and surface 20 of plate 18.

Second device preferably includes a table 44 that supports a base 48 having a substantially vertical column 50 extending from the base 48. Column 50 is rotatable in directions 68 or 74 about its axis 52. An arm 54 is slidably movable along column 50 in a vertical direction 72 and a horizontal direction 76, arm 54 preferably being maintained in a substantially horizontal position while being moved with respect to column 50 in vertical direction 72. Secured to one end of arm 54 is a tracer unit 46 that includes a tracer head 56 that has a wand 58. When used to take readings from a substantially vertical surface, such as a slot surface 222 of turbine disk 200 when the bore 204 is positioned substantially coincident with axis 38 of spindle 36 (FIG. 6), wand 58 is preferably oriented at an angle 78 that is substantially vertical while also providing a horizontal component when wand is actuated along its axis 66. Wand 58 extends from the tracer head 56 to a stylus 60, stylus 60 preferably extending substantially perpendicular to wand 58, and terminating at a tip 62. When tip 62 is placed in contact with a surface of an object to be inspected with the wand 58 being directed to travel along its axis 66, preferably toward tracer head 56, a pair of sensors (not shown) preferably housed within the tracer head 56 provide signals to an algorithm, such as a computer program (not shown). One of the sensors is associated with movement of the wand 58 along its axis 66, while the other sensor is associated with angular rotation 82 about axis 80 of the wand 58 in response to contact between the tip 62 and the surface of the slot 222. The algorithm converts the signals from the sensors into data points such as X and Y axis coordinates. The data points can then be compared to a predetermined range of values that are considered acceptable. Optionally, the data points can be transferred to a display (not shown), printed, or saved to a memory device for future reference or machining.

Preferably, a control program or algorithm executed by a microprocessor, or control device, or control panel (not shown) can be used to control the operation of the tracer head 56. This movement includes any individual or combinations of movement of the wand 58 of tracer head 56 along its axis 66, horizontal movement of the tracer head 56 along an axis 76 of arm 54, vertical movement of the combined tracer head 56 and arm 54 along axis 52 of column 50, angular rotational movement 82 of the combined wand 58 and tip 62 about axis 80 and rotational movement of the combined tracer head 56 and arm 54 about axis 52 of column 50. Alternately, all movements or any combination of these movements can be manually performed by an operator, if desired.

Figure 3:
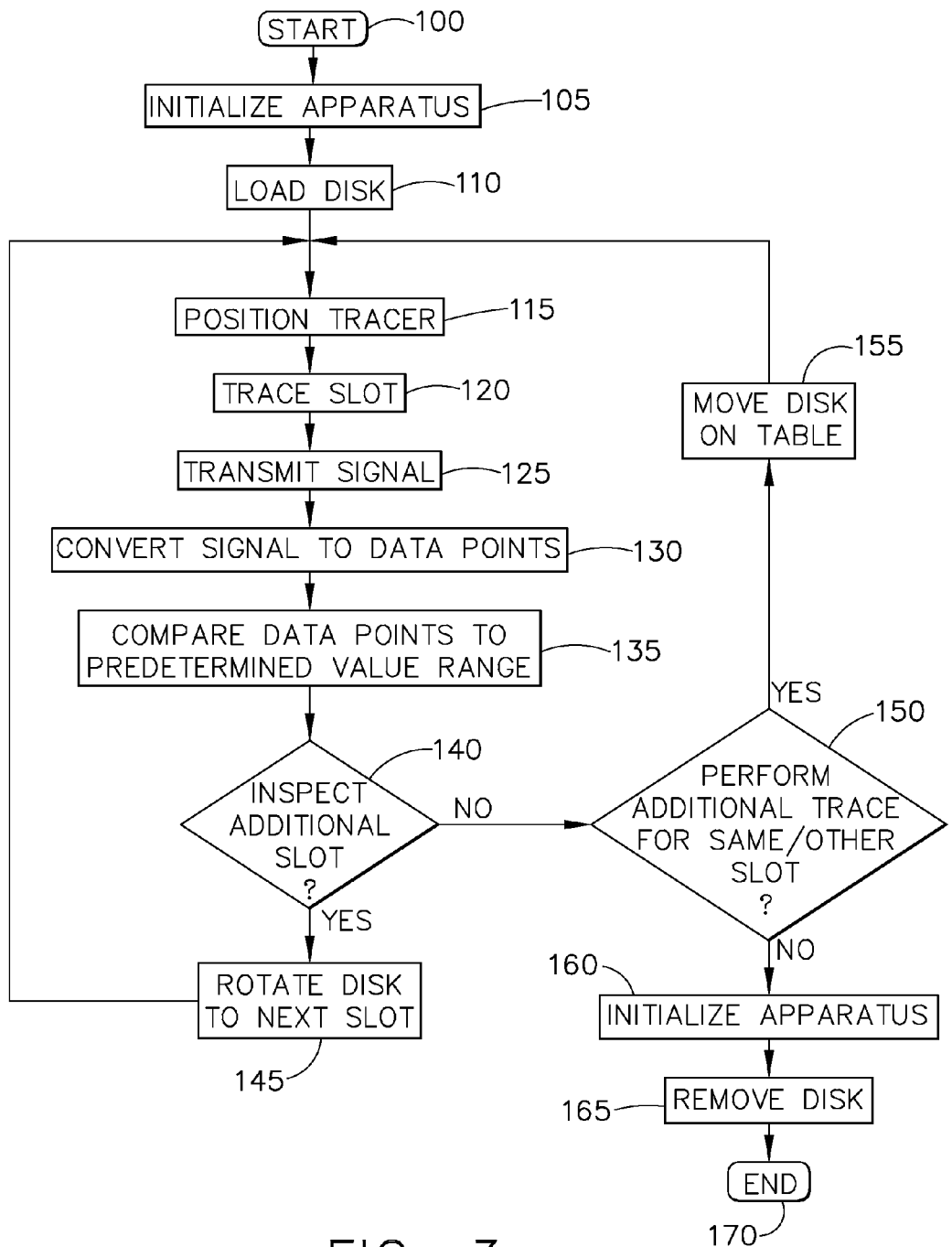
FIG. 3 illustrates a flow chart detailing the inspection method of the present invention.

FIG. 3 illustrates a flow chart detailing the inspection process using the inspection apparatus 10 of the present invention to inspect a dovetail edgebreak contour formed in a turbine disk 200. The control process of FIG. 3 can be performed as a separate control program executed by a microprocessor of control device, or a control panel or control process can be implemented as a sub-program in the control program for the inspection apparatus 10.

Figure 4:
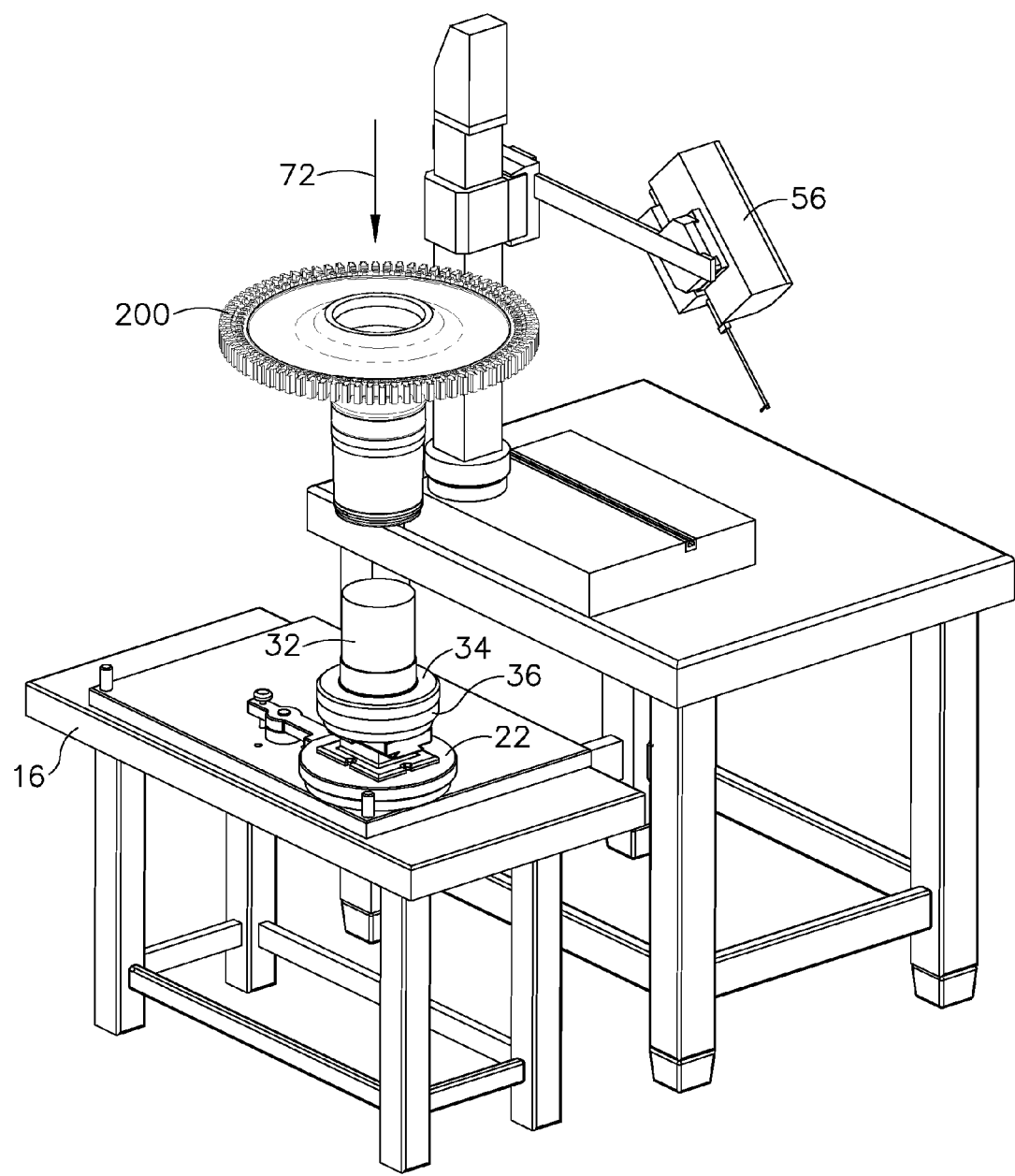
FIGS. 4-14 are perspective views showing the sequence of steps to perform the inspection of a turbine disk using the inspection apparatus of the present invention.
Figure 5:
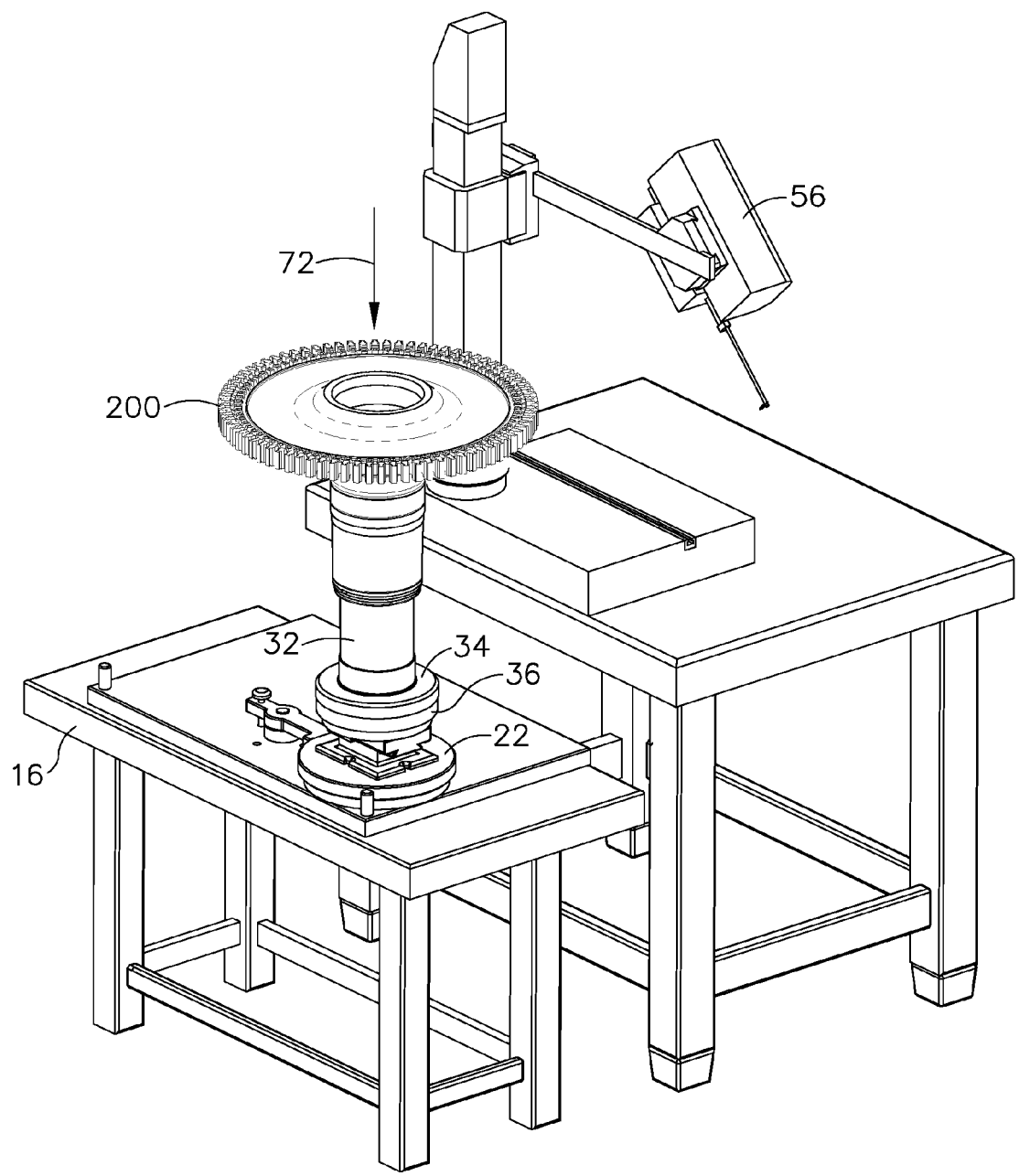
Figure 6:
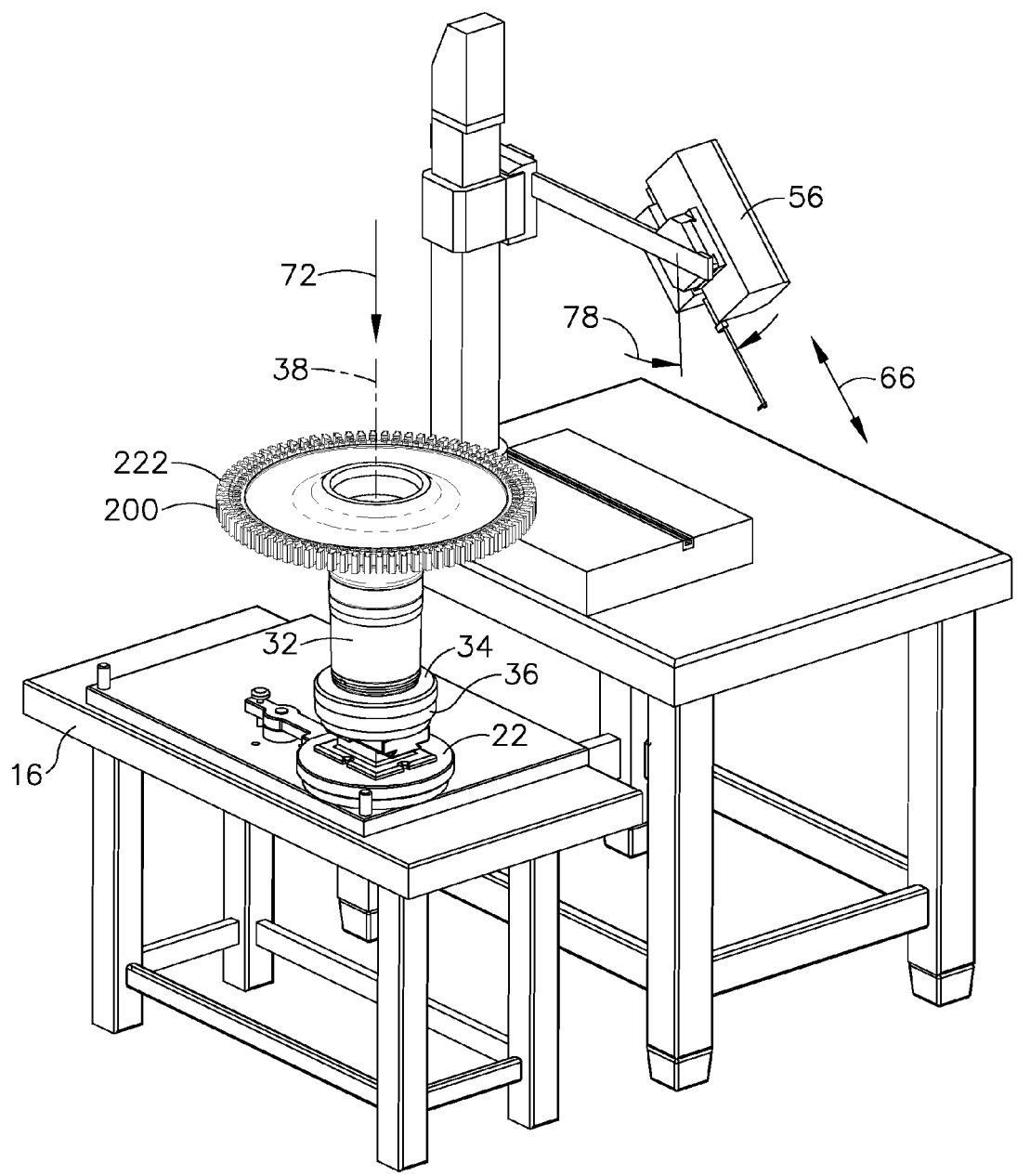

FIGS. 4-14 illustrate the sequence of steps of the process to perform the inspection of turbine disk 200 using the inspection apparatus 10 of the present invention. The process begins, after starting the process in step 100, with initialization of the inspection apparatus 10 in step 105 as shown in FIG. 2, which includes moving the tracer head 56 to a home position and moving the workpiece carriage 22 to a home position, such as the 3 o'clock position, if the tracer head 56 and workpiece carriage 22 are not already at their home positions. Although the process for moving the workpiece carriage 22 can be controlled by an operator, it is to be understood that the entire process, i.e., moving the workpiece carriage 22 and the tracer head 56, as well as loading/unloading the turbine disk 200, can be completely automated. Once the inspection apparatus 10 has been initialized, in step 110, the turbine disk 200 is loaded, or installed over the spindle 36 which extends from the workpiece carriage 22 as previously discussed and as shown in FIGS. 4-6.

Figure 7:
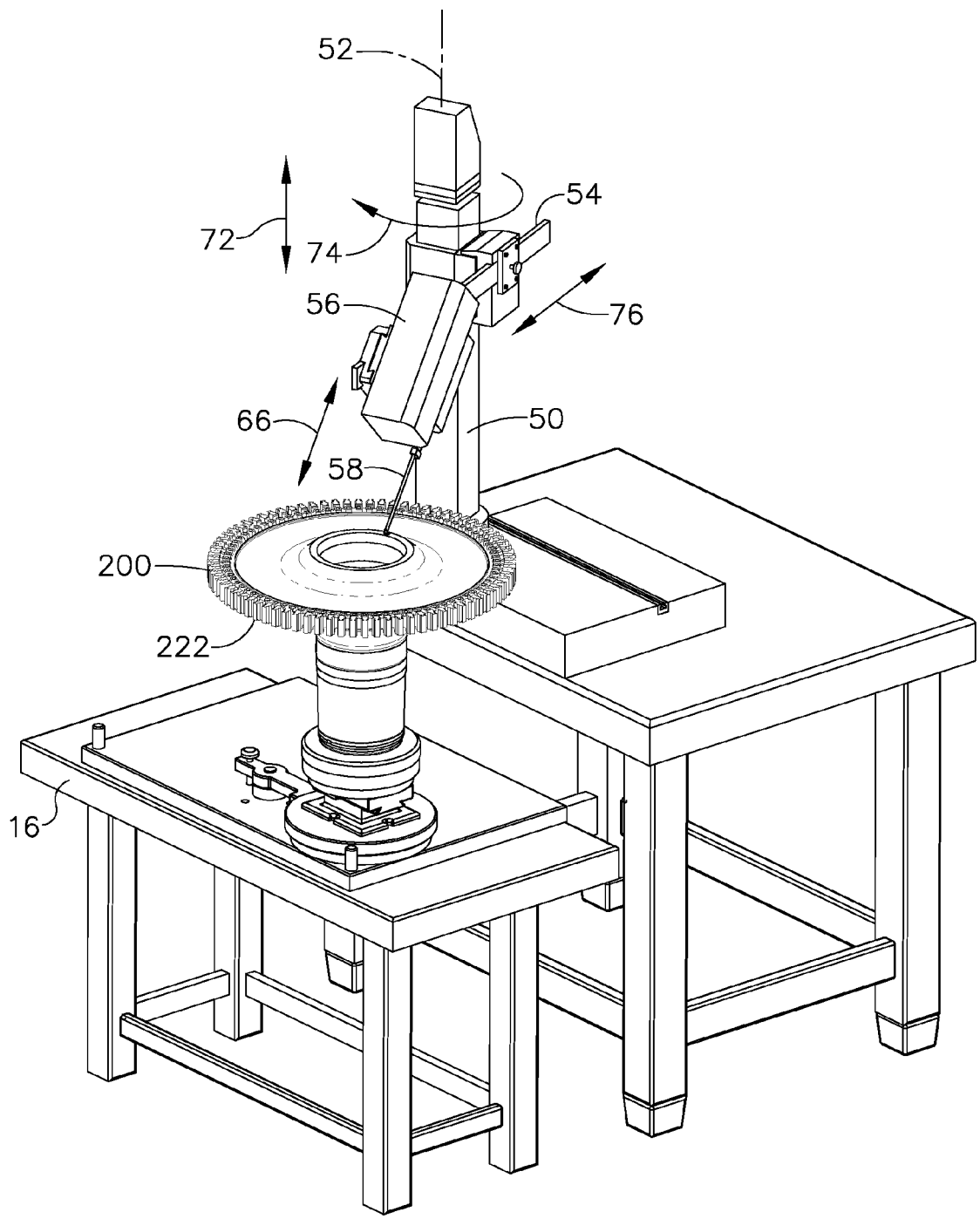
Figure 8:
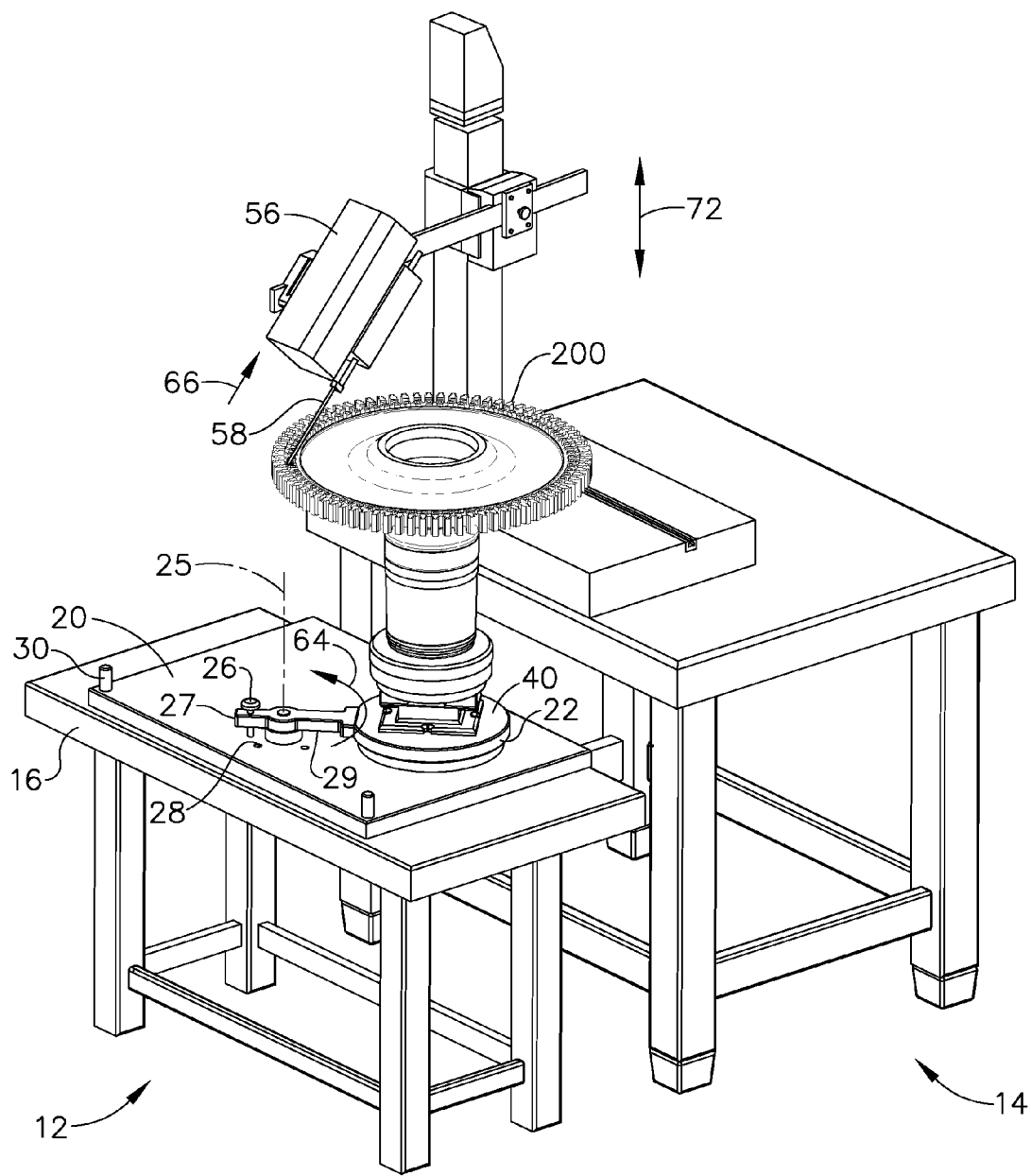

After the turbine disk 200 has been loaded in step 110, the tracer head 56 is positioned in step 115 by an appropriate combination of rotation 74 of the tracer head 56 about axis 52, travel along axis 76 of arm 54, rotation of the wand 58 about axis 80 and vertical travel 72 along vertical axis 52 as shown in FIG. 7. Once the tracer head 56 has been positioned so that the tip 62 contacts the surface of a slot 222 to be inspected, the tip 62 begins tracing the contour of the slot 222 in step 120 as the tip 62 is directed toward the tracer head 56 along axis 66. For example, if the turbine disk 200 is positioned in the three o'clock position, tip 62 traces the contour of the slot 22 along point of tangency 230 (FIG. 1A). It is critically important that the tip 62 is directed along a substantially linear path that is substantially normal to the point of tangency 230 of the slot 222, with an acceptable variance of about plus or minus three degrees between axes defining the path and the surface of the slot 222.

Figure 1B:
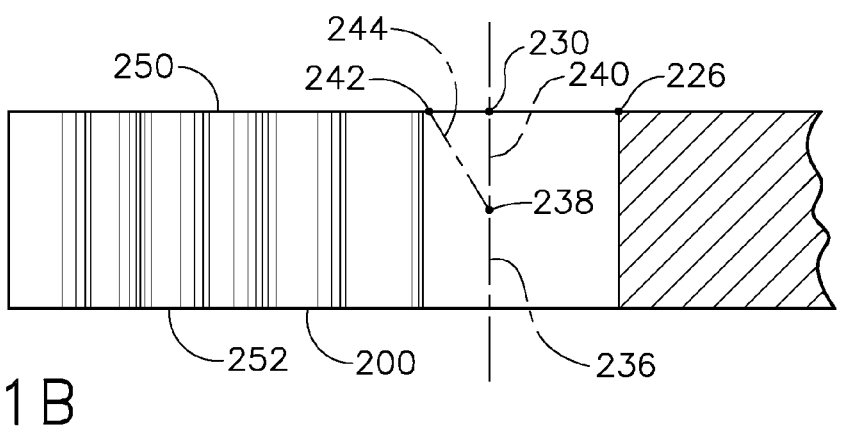
FIG. 1B is a side view taken along section 1-1 of FIG. 1A of the present invention.

For example, referring to FIGS. 1A-1B, in the three o'clock position, wand 58 and tip 62 contact slot 222 at contact point 238 and are preferably directed in travel direction 86 which is along axis 66, and that is coplanar with axis 228 that is normal to normal line 236, normal line 236 being substantially normal to an upper surface 250 and coincident with point of tangency 230. Point of tangency 230 is along an edge of base portion 216 of slot 222. When tip 62 is directed along direction 86, tip 62 traces a path from contact point 238 to point of tangency 230, or normal segment 240 which is coincident with line 236, then to termination point 246 that is located along the upper surface 250 of post 210. However, if wand 58 and tip 62 are directed along an alternate axis of travel 88 having an angle of deviation 90 from travel direction 86, the path of travel of tip 62 is different. Although the contact point 238 is the same in both instances, directing the wand 58 and tip 62 along direction 88 causes the tip 62 to trace a path 244 which extends from contact point 238 to contact point 242 along the edgebreak of the turbine disk 200, then to termination point 248 that is located along the upper surface 250 of post 210. It is clear that normal segment 240 is coincident with the line normal to the point of tangency 230, or line 236, and defines the shortest distance along the edgebreak of the turbine disk 200. Any deviation from the line normal to the point of tangency 240, such as deviation segment 244, increases the length of this line as seen by the tip 62 and sensed by the sensors associated with its movement, can provide erroneous information to the operator as to whether the edgebreak is within permissible tolerances as previously discussed.

It is to be understood that instead of point of tangency 230 being coincident with upper surface 250, point of tangency 230 can alternately be coincident with lower surface 252, which is opposite and substantially parallel to upper surface 250. Therefore, the discussion of the immediately preceeding paragraph is inverted. Axis 228, point of tangency 230 and termination points 246, 248 are coincident with lower surface 252. That is, instead of the tip 62 being directed from contact point 238 to point of tangency 230 then to termination point 246 along upper surface 250, the tip 62 is directed from contact point 238 to point of tangency 230 then to termination point 246 along lower surface 252. Thus, other that a preference between the upper surface 250 and the lower surface 252, the concept of operation is otherwise the same.

For the tracer head 56 to trace the surface contour of the slot 222 as the wand 58 is directed along axis 66, the sensors associated with movement of the wand 58 and tip 62 along axis 66 and rotation of the wand 58 and tip 62 about axis 80, respectively, transmit a signal in step 125 to the control panel, which then converts the signal to data points, such as X,Y coordinates, in step 130 as previously discussed. After the signal has been converted to data points, the data points are compared to predetermined value ranges in step 135 to determine whether an acceptable contour, i.e., such as chamfer, radius or other smooth surface transition, has been produced along the edgebreak of the slot 222. Step 135 includes saving the data points, and other information, such as acceptability of the edgebreak, to a memory device.

Once the data points have been compared in step 135, it may be desirable to inspect the same portion of a different, or additional slot 222. If the control panel (or operator) determines in step 140 to conduct a similar trace on an additional slot 222, the turbine disk 200 is rotated about axis 38 to locate the next desired slot 222 to inspect. Once the turbine disk 200 has been rotated to the next slot 222 for inspection, steps 115 through 135 are performed in a similar manner as previously discussed. After step 135 has been performed, the control panel (or operator) determines in step 140 whether to conduct the same trace on an additional slot 222. If an additional trace in step 140 is not to be performed, control of the process is shifted to step 150, wherein the control panel (or operator) determines in step 150 whether to perform an additional trace for the same or other slot 222 on the turbine disk 200. If an additional trace is to be performed, the turbine disk 200 is moved along the surface 20 of plate 18 in step 155 to a new position, such as the twelve o'clock position. Moving the turbine disk 200 involves rotating the turbine disk 200 about axis 25 that is coincident with pivot 24 by removing the locating pin 26 from the table aperture 28, and initiating the air bearing 40 as previously discussed and shown in FIGS. 8 and 9.

Prior to or contemporaneously with rotating the turbine disk 200 about axis 25, tip 62 is retracted along axis 66 until there is sufficient clearance between the tip 62 and the turbine disk 200 or rotated about axis 80 to avoid damage to the tip 62 or wand 58. Once the turbine disk 200 has been sufficiently rotated about axis 25 and the aperture 27 of the neck portion 29 aligning with the corresponding table aperture 28, the locating pin 26 is directed through the aperture 27 and the table aperture 28 to fix the position of both the workpiece carriage 22 and turbine disk 200. After fixing the position of the turbine disk 200, the turbine disk 200 is then rotated about axis 38 in a direction 70 (FIG. 9) if required, to provide a favorable orientation for the tip 62 to engage a different portion of the previously inspected slot 222 or even a different slot 222. Additionally, it may be necessary to provide minor adjustments, such as X,Y axis adjustments as provided by the cross-slide table 42, to permit access to a different region of the slot 222. However, it is believed that if tables 16 and 44 are properly spaced, the effective length of arm 54 is adjusted and if the neck portion 29 of the workpiece carriage 22 includes additional apertures so that the effective rotational radius defined by rotating the workpiece carriage 22 about pivot 24 can also be modified without requiring a change to the table apertures 28, many, if not all configurations of turbine disks can be accommodated by the inspection apparatus 10.

Figure 9:
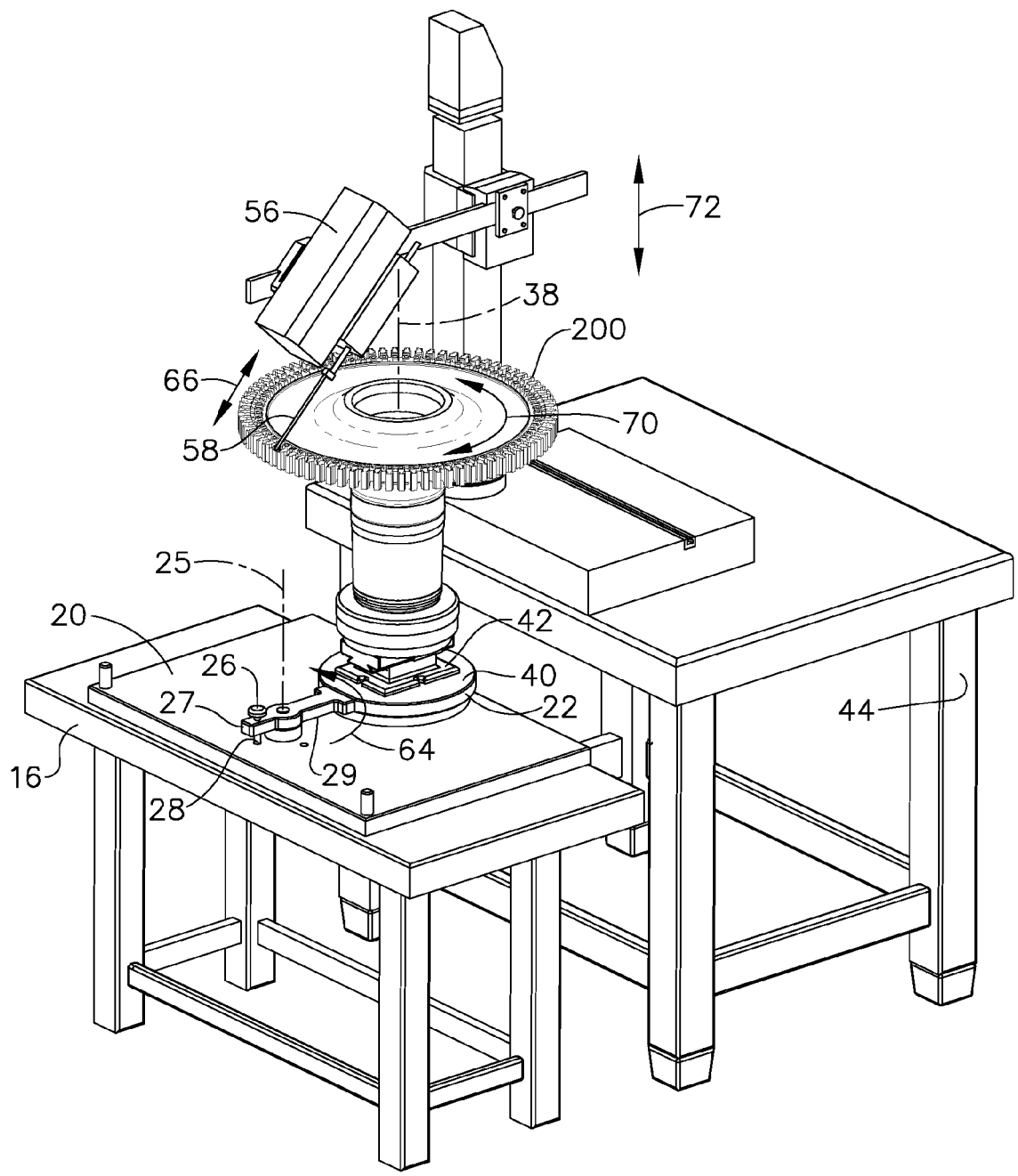
Figure 10:
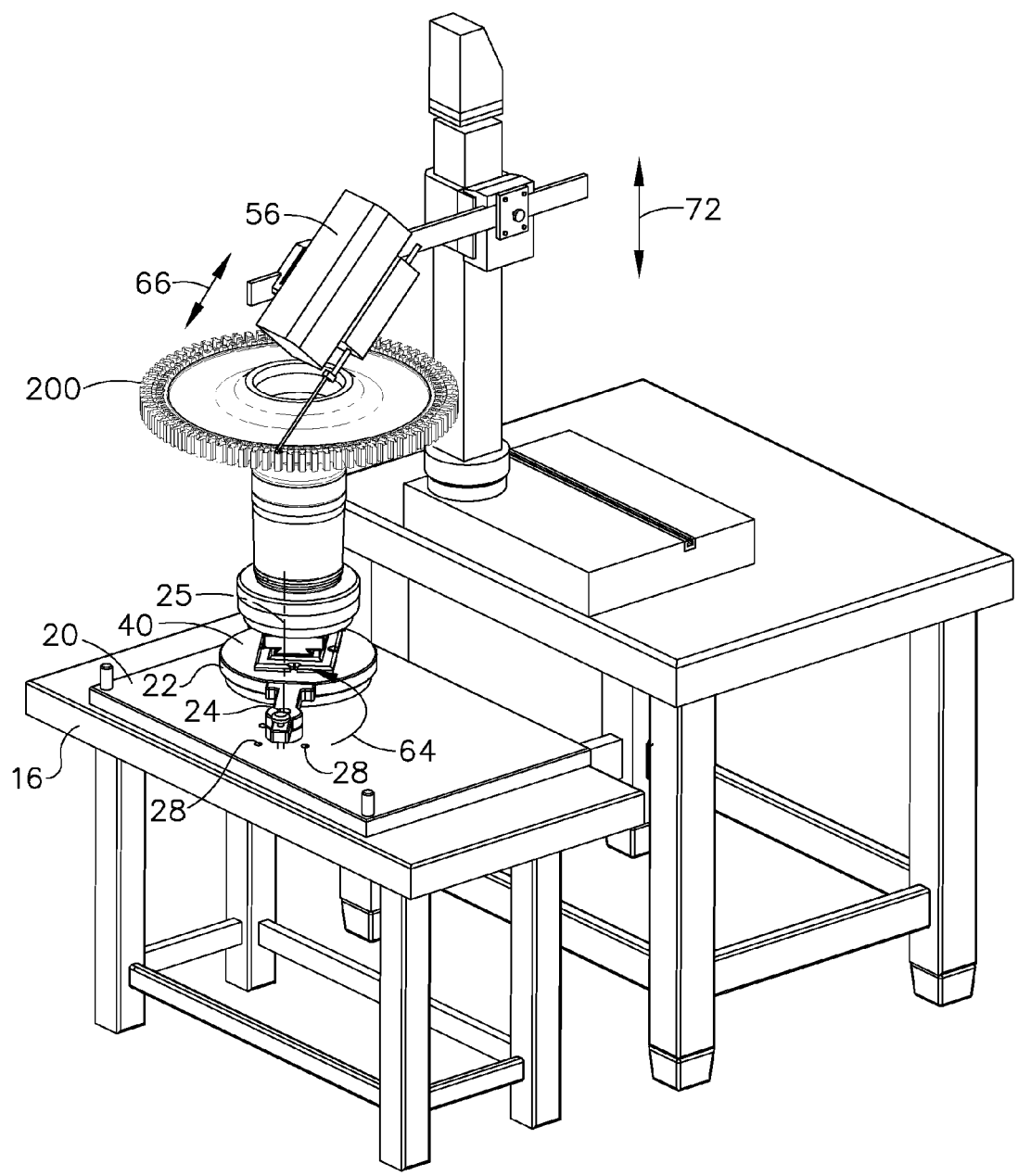
Figure 11:
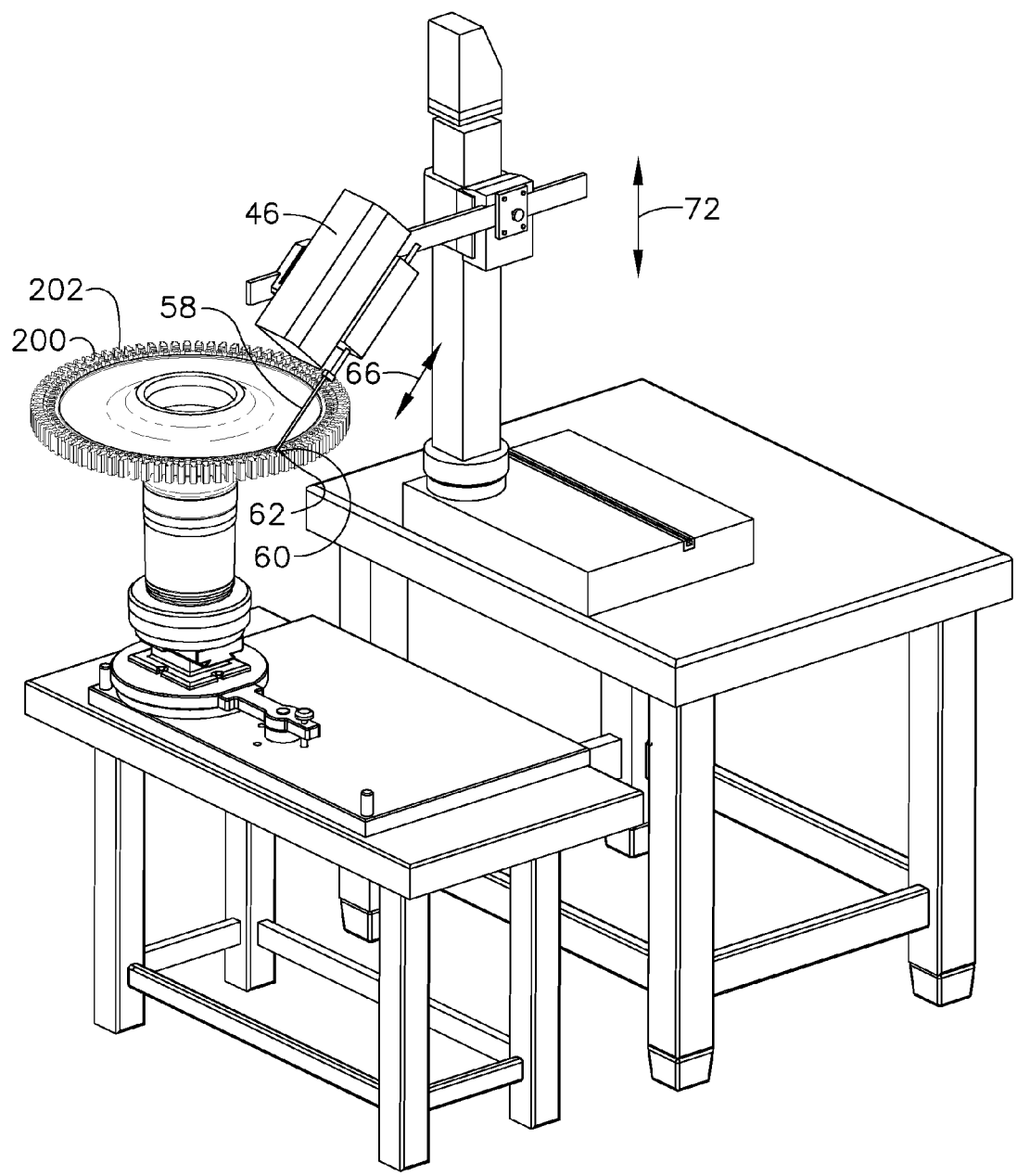
Figure 12:
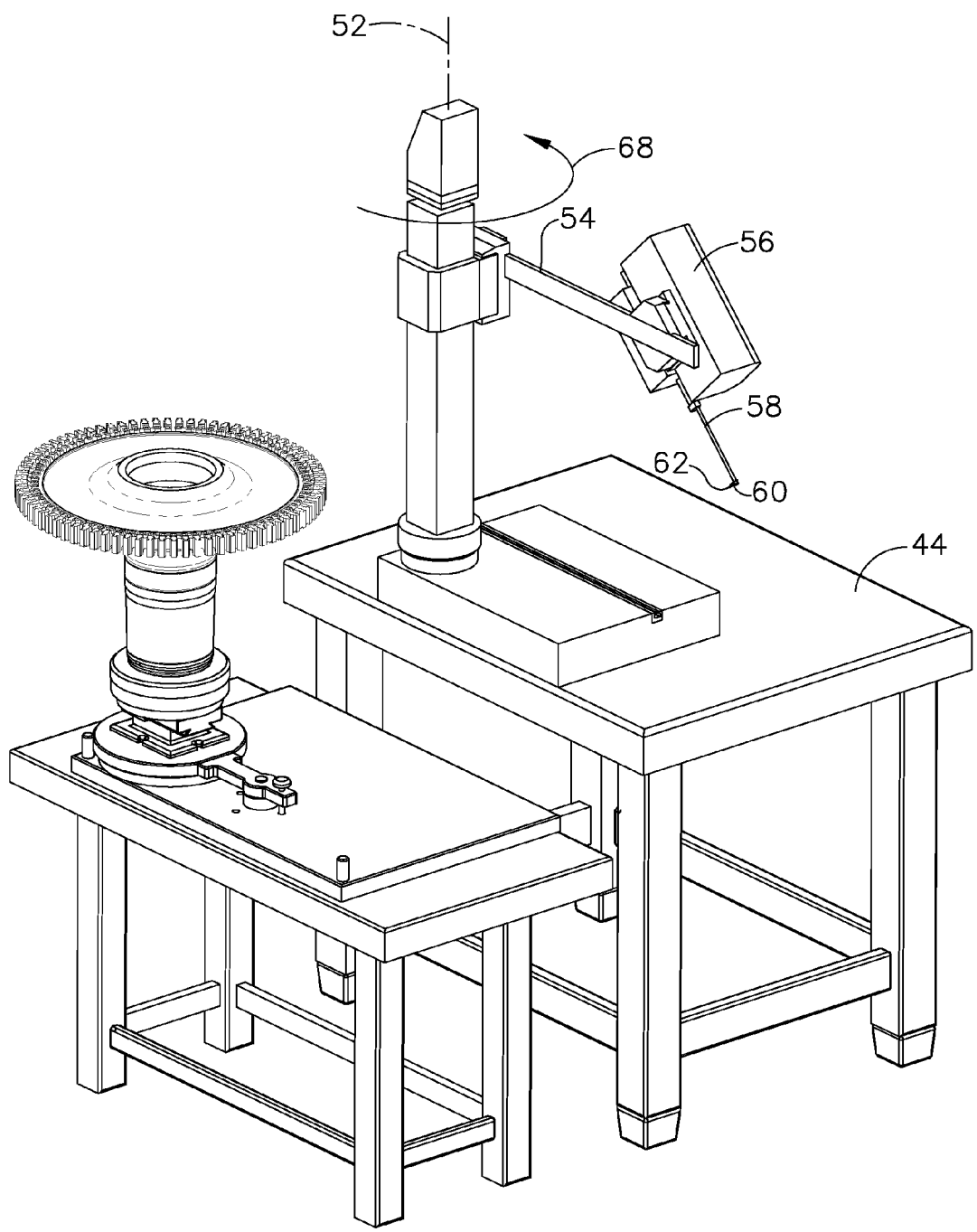
Figure 13:
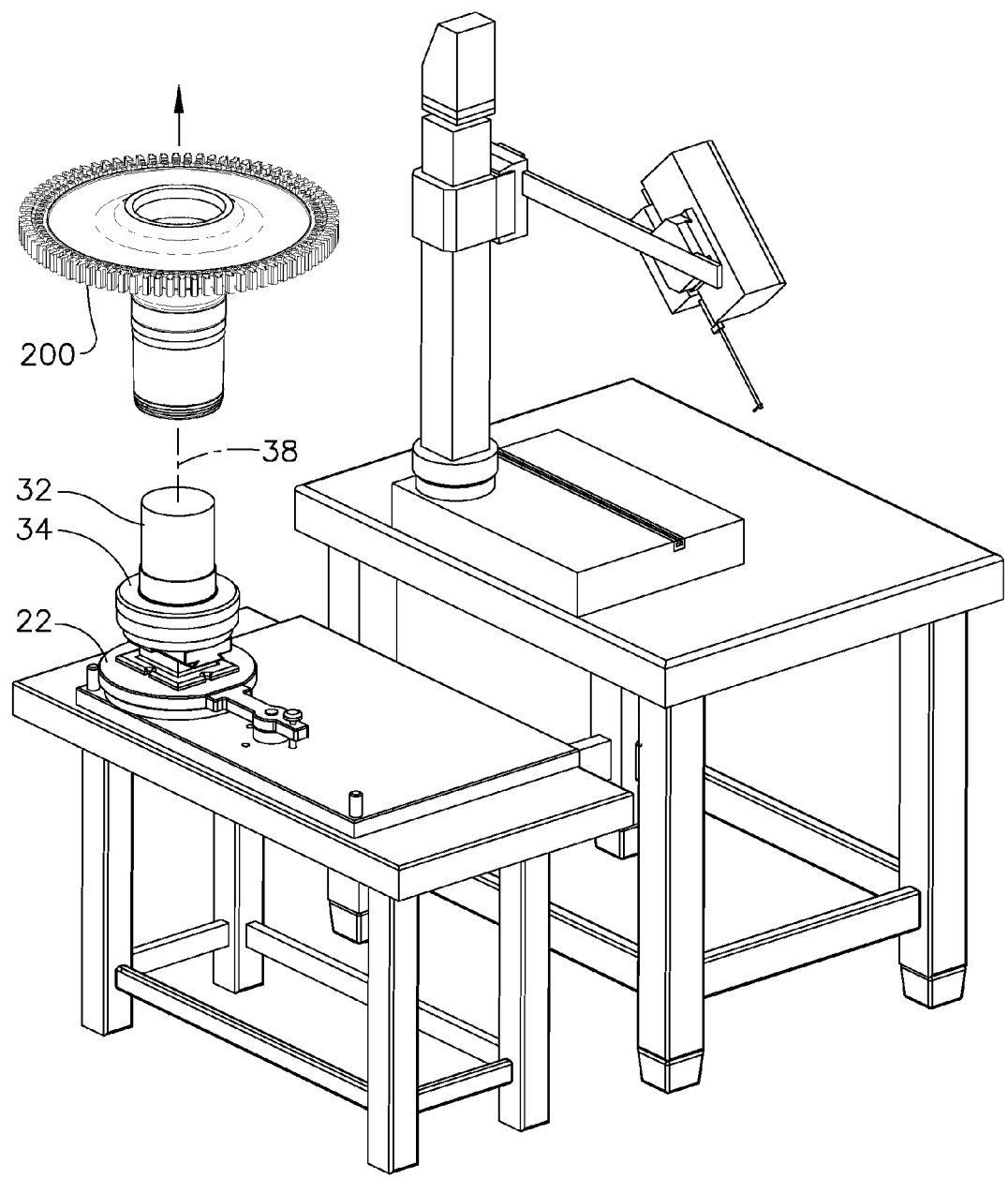
Figure 14:
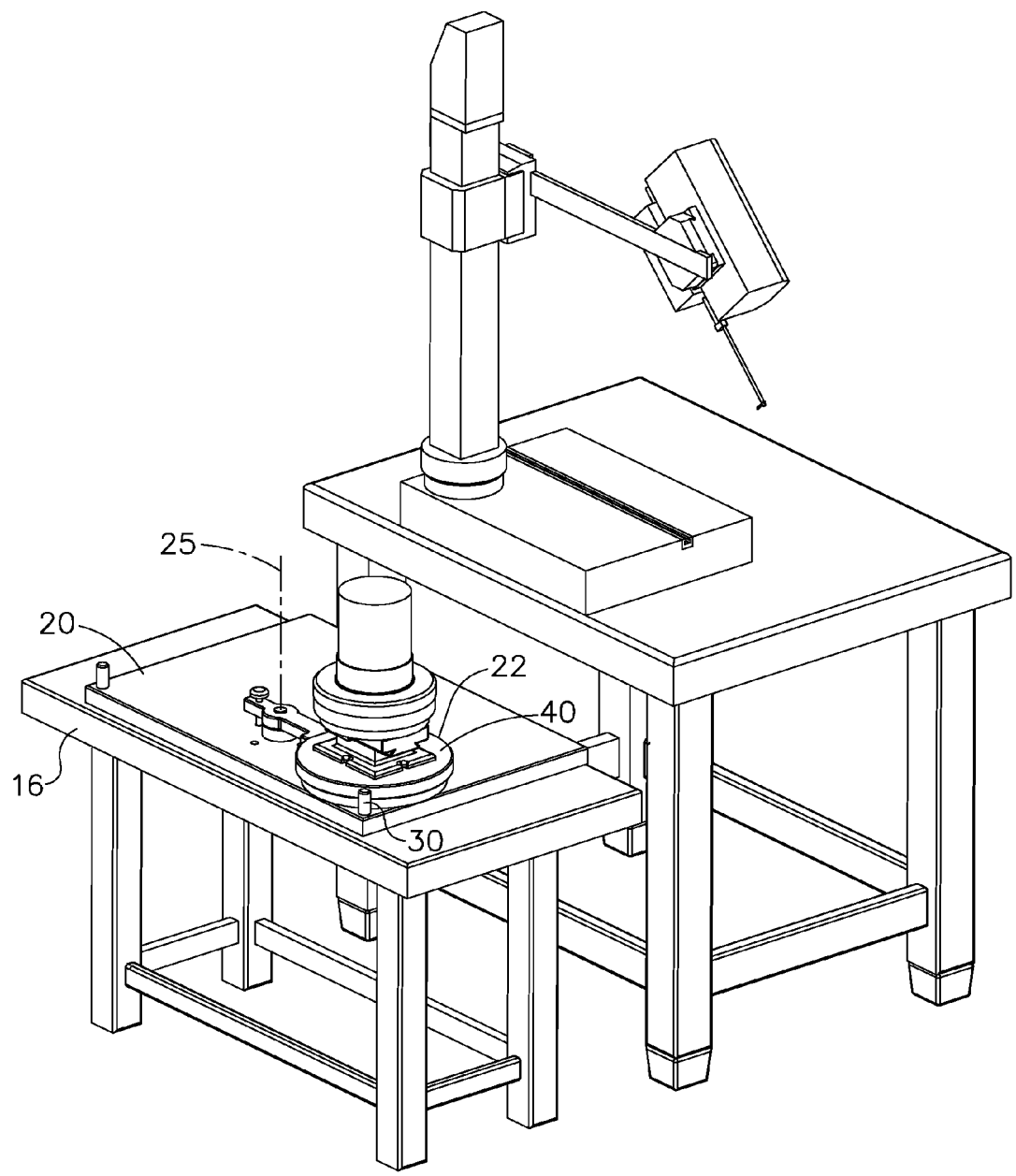

Once the turbine disk 200 is moved along the surface 20 of plate 18 in step 155 to the twelve o'clock position, as shown in FIG. 9, the tracer head 56 is moved into position in step 115 so that the tip 62 contacts the slot 222. However, the tracer head 56 is already substantially in the desired position since it had been moved during the previous step 145. Therefore, to position the tip 62 in contact with a different region of the slot 222 of the turbine disk 200, all that should be required is to actuate the wand 58 along axis 66 or rotate the wand 58 about axis 80, although minor adjustments to move the tracer head 56 along axis 72 and/or minor adjustments to the cross-slide table 42 may be required to move the turbine disk 200 with respect to the workpiece carriage 22. After the tracer head 56 has been positioned, steps 120 through 135 are achieved in a substantially identical manner as previously described. Upon completion of step 135, the control panel (or operator) determines in step 140 whether to conduct the same trace on a different slot 222. If the same trace is to be performed on a different slot 222, the turbine disk 200 is rotated about axis 38 in step 145 in a manner as previously discussed. Control is then returned to steps 115-135 as previously discussed.

After steps 115 through 135 have been performed, the control panel (or operator) determines in step 140 whether to inspect an additional slot 222. If an inspection of an additional slot in step 140 is not to be performed, control of the process is shifted to step 150, wherein the control panel (or operator) determines in step 150 whether to perform an additional trace on the same or other slot 222 on the turbine disk 200. If the control panel determines that an additional trace on the same slot 222 is to be inspected, in step 155, the workpiece carriage 22 is moved along the surface 20 of the plate 18 about pivot 24 to the nine o'clock as previously discussed and as shown in FIG. 6. Once the turbine disk 200 has been moved, steps 115 through 135 are performed in a manner substantially similar as previously discussed. After step 135 has been performed, the control panel (or operator) determines in step 140 whether to perform the same trace on an additional slot 222. If the same trace on an additional slot 222 in step 140 is to be performed, control of the process is shifted to step 145, then to steps 115 through 135 as previously discussed. After step 135 has been performed, the control panel (or operator) determines in step 140 whether to perform the same trace on an additional slot 222. If the same trace on an additional slot 222 in step 140 is not to be performed, control of the process is shifted to step 150, wherein the control panel (or operator) determines in step 150 whether to conduct an perform an additional trace for the same or other slot 222 on the turbine disk 200. If the control panel determines that an additional trace for the same slot 222 is not to be inspected, the apparatus settings are initialized at step 160, which preferably moves the tracer head 56 and the workpiece carriage 22 to their respective home positions as previously discussed. After the apparatus settings are initialized, the turbine disk 200 is removed from the inspection apparatus 10 at step 165 before the process terminates at step 170.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of inspecting a contour of an edge of a cutout of a plurality of cutouts formed in a disk, each cutout of the plurality of cutouts for fixedly receiving a turbine blade, the method comprising the steps of:
   providing a first device for receiving the disk;
   providing a second device having at least two sensors and an instrument in association with the at least two sensors, the first device securing the disk at a predetermined orientation to the sensor;
   securing the disk to the first device;
   positioning the instrument adjacent a cutout of a plurality of cutouts formed in the disk;
   directing a tip of the instrument over a point of tangency along an edge of a cutout of the plurality of cutouts, the tip following a path along the surface of the contour that is substantially coincident with a plane defined by an axis of tangency with the point of tangency and a line substantially normal to the edge of the contour, the instrument being in physical contact with the surface of the contour;
   transmitting a signal from the at least two sensors based upon movement of the instrument to an algorithm;
   converting the signal received by the algorithm to a plurality of positions along the path; and
   comparing the plurality of positions to predetermined ranges of values for determining acceptability of the contour of an edge of the cutout of the plurality of cutouts.

2. The method of claim 1 wherein the steps of the method are automated.

3. The method of claim 1 wherein the disk is usable with in a turbine engine.

4. The method of claim 1 wherein the disk is newly fabricated.

5. The method of claim 1 wherein the disk has previously been in service.

6. The method of claim 1 wherein the step of providing a second device includes providing a second device comprising:
   a tracer head movably supported from the disk, the tracer head slidably directing and rotatably carrying the instrument, one sensor of the at least two sensors associated with slidably directing the instrument substantially along the axis of the instrument and another sensor of the at least two sensors associated with rotation of the instrument.

7. The method of claim 6 wherein the movable support of the tracer head comprising:
   an arm slidably connected to the tracer head;
   a column for slidably securing the arm in a fixed orientation along the axis of the arm, selectively positioning the arm along the axis of the column and rotatably carrying the arm about the axis of the column.

8. The method of claim 1 wherein the step of providing a first device includes providing a first device comprises:
   a plate having a surface;
   a carriage slidably movable along the surface; and
   a spindle extending from the carriage for receiving a bore of the disk.

9. The method of claim 8 wherein the first device further comprises:
   a means for selectively slidably rotating the carriage along the surface about a pivot formed in the surface of the plate.

10. The method of claim 9 wherein the carriage further comprises:
    adjustment means configured to provide adjustment along two mutually perpendicular axes.

11. The method of claim 10 wherein the carriage further comprises:
    rotation means for rotating the disk about an axis defined by the spindle.

12. The method of claim 9 further comprising:
    a sleeve installed over the spindle.

13. The method of claim 12 wherein the sleeve extends to a base.

14. The method of claim 13 wherein the sleeve and base are composed of materials sufficiently soft so as not to mar the bore of the disk.

15. The method of claim 14 wherein the first disk is further comprised of:
    means of providing a substantially frictionless interface between the surface and the carriage.

16. The method of claim 15 wherein the means of providing a substantially frictionless interface is an air bearing.

17. An apparatus for inspecting a contour of an edge of a cutout of a plurality of cutouts formed in a disk, each cutout of the plurality of cutouts for fixedly receiving a turbine blade, the apparatus comprising:
    a first device for receiving the disk;
    a second device having at least two sensors and an instrument in association with the at least two sensors, the first device securing the disk at a predetermined orientation to the sensor and the instrument being positioned adjacent a cutout of a plurality of cutouts formed in the disk; and
    wherein a tip of the instrument being directed over a point of tangency along an edge of a cutout of the plurality of cutouts, the tip following a path along the surface of the contour that is substantially coincident with a plane defined by an axis of tangency with the point of tangency and a line substantially normal to the edge of the contour, the instrument being in physical contact with the surface of the contour, the at least two sensors transmitting a signal based upon movement of the instrument to an algorithm, the algorithm converting the signal received to a plurality of positions along the path; and
    means to compare the plurality of positions to predetermined ranges of values for determining acceptability of the contour of an edge of the cutout of the plurality of cutouts.

18. The apparatus of claim 17 being automated.

19. The apparatus of claim 17 wherein the first device comprises:
    a plate having a surface;
    a carriage slidably movable along the surface; and
    a spindle extending from the carriage for receiving a bore of the disk.

20. The apparatus of claim 17 wherein the second device comprising:
    a tracer head movably supported from the disk, the tracer head slidably directing and rotatably carrying the instrument, one sensor of the at least two sensors associated with slidably directing the instrument substantially along the axis of the instrument and another sensor of the at least two sensors associated with rotation of the instrument.

* * * * *